(12) United States Patent
Weflen

(10) Patent No.: US 10,574,062 B2
(45) Date of Patent: Feb. 25, 2020

(54) DC-POWERED SYSTEM FOR CONTROLLING AN AIR COMPRESSOR OR HYDRAULIC FLUID PUMP

(71) Applicant: Darryl Weflen, Edmonton (CA)

(72) Inventor: Darryl Weflen, Edmonton (CA)

(*) Notice: Subject to any disclaimer, the term of this patent is extended or adjusted under 35 U.S.C. 154(b) by 0 days.

(21) Appl. No.: 15/121,945

(22) PCT Filed: Feb. 27, 2015

(86) PCT No.: PCT/CA2015/000122
§ 371 (c)(1),
(2) Date: Aug. 26, 2016

(87) PCT Pub. No.: WO2015/127541
PCT Pub. Date: Sep. 3, 2015

(65) Prior Publication Data
US 2017/0070065 A1    Mar. 9, 2017

Related U.S. Application Data

(60) Provisional application No. 61/946,327, filed on Feb. 28, 2014.

(51) Int. Cl.
*H02J 7/00* (2006.01)
*H02J 7/35* (2006.01)
(Continued)

(52) U.S. Cl.
CPC ............ *H02J 7/0013* (2013.01); *F04C 18/16* (2013.01); *F04C 28/00* (2013.01);
(Continued)

(58) Field of Classification Search
CPC . G06F 17/00; G06F 19/00; G06F 7/00; F04B 17/05; F02B 63/00; F02B 63/04;
(Continued)

(56) References Cited

U.S. PATENT DOCUMENTS 3,974,660 A * 8/1976 Farr ..................... B60H 1/3222
62/229
4,590,767 A * 5/1986 Gardner, Jr. ............. F02G 1/04
180/165
(Continued)

FOREIGN PATENT DOCUMENTS

| WO | WO2007116239 A1 | 10/2007 |
| WO | 2013031768 | 3/2013 |
| WO | 2013162448 | 10/2013 |

OTHER PUBLICATIONS

Canadian Intellectual Property Office, International Search Report for PCT/CA2015/000122, dated May 28, 2015.
(Continued)

*Primary Examiner* — Hal Kaplan
*Assistant Examiner* — Jagdeep S Dhillon
(74) *Attorney, Agent, or Firm* — Dentons US LLP

(57) ABSTRACT

A motor vehicle-mounted system for controlling an air compressor or hydraulic fluid pump is provided. The system can alternatively include a battery box or an engine-driven welder configured for supplying DC power to an electric motor via an electric motor controller. The electric motor can operate an air compressor, which can further include an air tank for storing compressed air. The electric motor can also operate a hydraulic fluid pump for operating a pressurized hydraulic fluid system.

46 Claims, 13 Drawing Sheets

(51) Int. Cl.
*F04C 18/16* (2006.01)
*F04C 28/00* (2006.01)
*F04C 29/00* (2006.01)
*H02J 9/06* (2006.01)
*H02P 31/00* (2006.01)

(52) U.S. Cl.
CPC ............ *F04C 29/0085* (2013.01); *H02J 7/35* (2013.01); *H02J 9/06* (2013.01); *H02P 31/00* (2013.01); *F04C 2240/40* (2013.01)

(58) Field of Classification Search
CPC . F02B 63/06; F03D 9/00; B60K 16/00; F01B 23/10
USPC ........ 307/43, 66, 64, 17, 80, 9.1, 10.1, 10.2, 307/10.6, 10.7; 323/222, 326; 180/68.5, 180/53.2, 315; 701/22, 24, 50, 99, 56; 417/364, 366; 280/151; 290/51, 1 R
See application file for complete search history.

(56) References Cited

U.S. PATENT DOCUMENTS

| | | | | |
|---|---|---|---|---|
| 5,248,436 | A * | 9/1993 | Kovaletz | B24C 3/06 210/693 |
| 5,720,423 | A | 2/1998 | Kondo et al. | |
| 6,226,582 | B1 * | 5/2001 | Adsett | B66F 9/20 180/315 |
| 7,861,537 | B2 | 1/2011 | Givens | |
| 2008/0048457 | A1 * | 2/2008 | Patel | B60K 16/00 290/1 R |
| 2008/0122195 | A1 * | 5/2008 | Beeson | B60K 25/00 280/151 |
| 2008/0297103 | A1 * | 12/2008 | Windsor | H01M 2/1072 320/101 |
| 2009/0162218 | A1 * | 6/2009 | Weflen | B60L 1/00 417/364 |
| 2009/0194067 | A1 * | 8/2009 | Peotter | B66C 23/42 123/350 |
| 2011/0048572 | A1 * | 3/2011 | Batson | B64F 1/28 141/1 |
| 2011/0179781 | A1 * | 7/2011 | Fant | F03G 6/00 60/327 |
| 2011/0182754 | A1 | 7/2011 | Gathers et al. | |
| 2011/0308382 | A1 * | 12/2011 | Huff | B60K 6/12 91/459 |
| 2014/0041374 | A1 | 2/2014 | Domes | |
| 2014/0338720 | A1 * | 11/2014 | Caster | H02S 10/00 136/245 |
| 2015/0285541 | A1 * | 10/2015 | Borchers | F25D 13/00 62/235.1 |
| 2017/0070065 | A1 * | 3/2017 | Weflen | F04B 49/06 |

OTHER PUBLICATIONS

Canada Office Action dated Dec. 4, 2018, issued in connection with related Canadian Patent Application No. 2,844,410, filed Mar. 3, 2014, 5 pages.

* cited by examiner

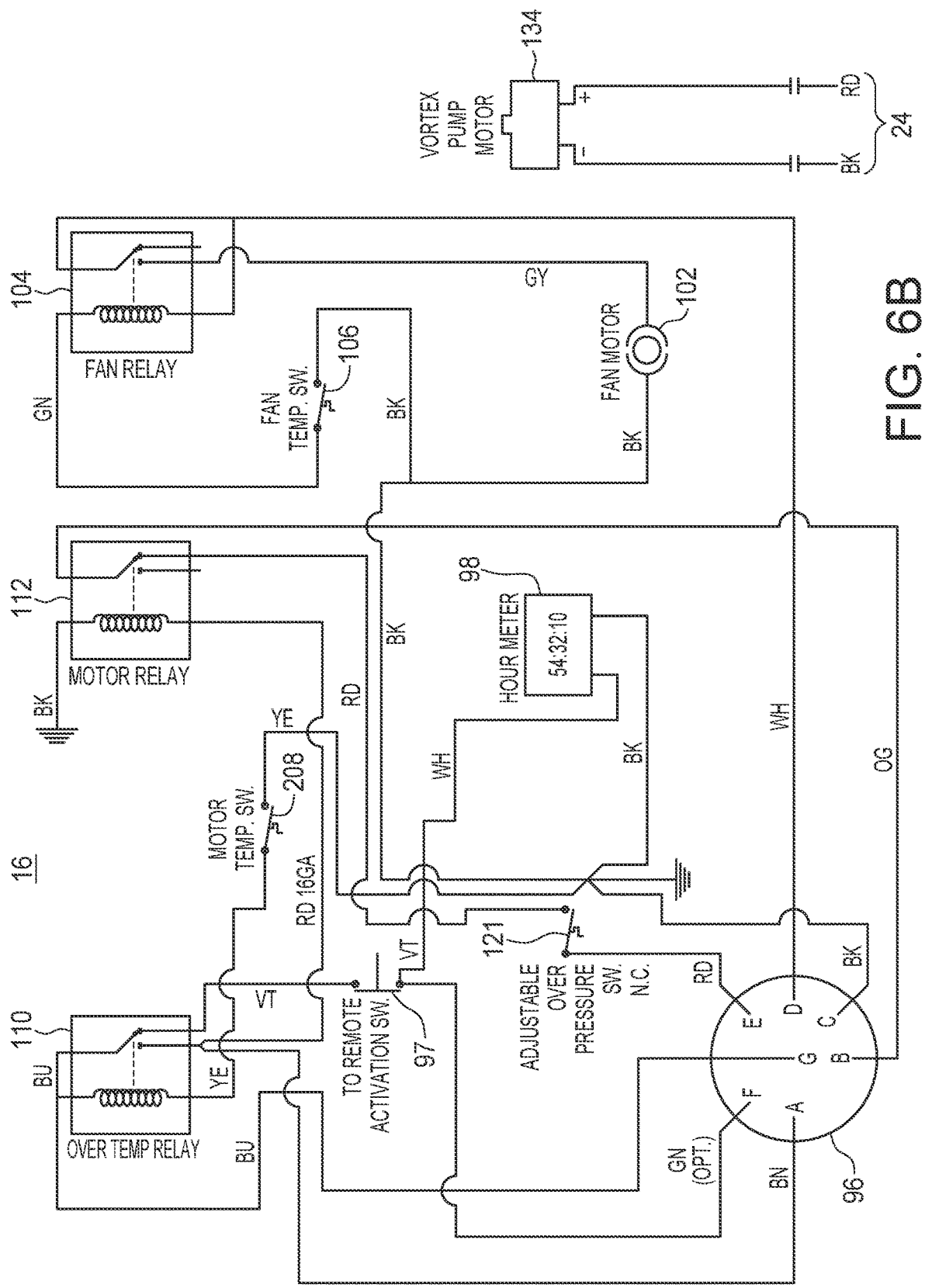

DC-POWERED SYSTEM FOR CONTROLLING AN AIR COMPRESSOR OR HYDRAULIC FLUID PUMP

CROSS-REFERENCE TO RELATED APPLICATIONS

This application is a National Stage Entry of International Application No. PCT/CA2015/000122, filed on Feb. 27, 2015 that claims the benefit of and priority to U.S. Provisional Application No. 61/946,327, filed Feb. 28, 2014, both of which are hereby incorporated by reference into this application in their entirety.

TECHNICAL FIELD

The present disclosure is related to the field of direct current ("DC") powered systems for operating machinery, in particular, systems comprising electric motors for operating air compressors or hydraulic pumps, particularly, such systems for installation on service vehicles used to service heavy duty equipment, machinery and vehicles.

BACKGROUND

Service vehicles used by service personnel to service heavy duty equipment, machinery and vehicles often require a source of compressed air or a supply of pressurized hydraulic fluid to aid in the service of said equipment, machinery or vehicles. While there are systems that can provide an adequate supply of compressed air or pressurized hydraulic fluid that can be installed on a typical service vehicle, such systems are bulky and cumbersome to install and operate.

It is, therefore, desirable to provide a compact system that can be installed on a service vehicle for providing source of compressed air or a supply of pressurized hydraulic fluid to aid in the service of heavy duty equipment, machinery or vehicles.

SUMMARY

A DC-powered system for controlling an air compressor or a hydraulic fluid pump that is compact enough for installing on a service vehicle is provided.

Broadly stated, in some embodiments, a direct current powered system for controlling an air compressor or a hydraulic fluid pump can be provided, the system comprising: means for supplying a source of direct current ("DC") power; means for controlling the DC power; means for activating the system; and means for operating the air compressor or the hydraulic fluid pump upon the DC power being supplied to said operating means by the controlling means.

Broadly stated, in some embodiments, the means for supplying the source of DC power can further comprise one or more of a group consisting of at least one DC battery, a battery charger, an alternating current ("AC") power rectifier, a transfer switch for selecting between different sources of AC power, a welding unit configured for supplying DC power and a solar panel charging unit.

Broadly stated, in some embodiments, the means for controlling the DC power can further comprise an electric motor controller.

Broadly stated, in some embodiments, the activating means can further comprise a control box configured for activating and deactivating the controlling means.

Broadly stated, in some embodiments, the operating means can further comprise a DC power solenoid configured for turning on and off the flow of DC power to an electric motor configured for operating the air compressor or the hydraulic fluid pump.

Broadly stated, in some embodiments, a direct current powered system can be provided for controlling an air compressor or a hydraulic fluid pump, the system comprising: at least one battery configured for supplying direct current ("DC") power; a control panel operatively connected to the at least one battery, the control panel configured to control the flow of the DC power supplied by the at least one battery; and an electric motor operatively connected to the control panel, the electric motor configured to operate the air compressor or the hydraulic fluid pump upon DC power being supplied to the electric motor by the control panel.

Broadly stated, in some embodiments, the at least one battery can be disposed in a battery box, the battery box further comprising a battery charger configured for charging the at least one battery, the battery box further configured for receiving at least one source of alternating current ("AC") power for powering the battery charger.

Broadly stated, in some embodiments, the battery box can further comprise an AC power transfer switch for controlling the flow of the at least one source of AC power to the battery charger.

Broadly stated, in some embodiments, the system can further comprise a solar panel charging unit configured for charging the at least one battery.

Broadly stated, in some embodiments, the control panel can further comprise a motor controller for controlling the flow of DC power to the electric motor.

Broadly stated, in some embodiments, the system can further comprise a control box operatively connected to the control panel, the control box configured for activating and deactivating the control panel.

Broadly stated, in some embodiments, the air compressor can further comprise a screw-type air compressor.

Broadly stated, in some embodiments, the system can further comprise an air tank operatively connected to the screw-type air compressor.

Broadly stated, in some embodiments, the system can further comprise a pressurized hydraulic fluid system operatively connected to the hydraulic fluid pump.

Broadly stated, in some embodiments, the hydraulic fluid system can comprise one or more of a group consisting of hydraulic fluid tanks, hydraulic fluid accumulators, coolers and heat exchangers, hydraulic fluid filters and filtration components, hydraulic motors, control valves, swash plates, hydraulically-operated rams and cylinders, hydraulic fluid hoses, lines and fittings, hydraulic fluid manifolds, hydraulic fluid pressure gauges and transducers, and hydraulic fluid pressure switches.

BRIEF DESCRIPTION OF THE DRAWINGS

FIG. 6B is an electrical schematic depicting a second embodiment of the electrical circuit of FIG. 6B for use with a hydraulic fluid pump system.

DETAILED DESCRIPTION OF EMBODIMENTS

Figure 1:
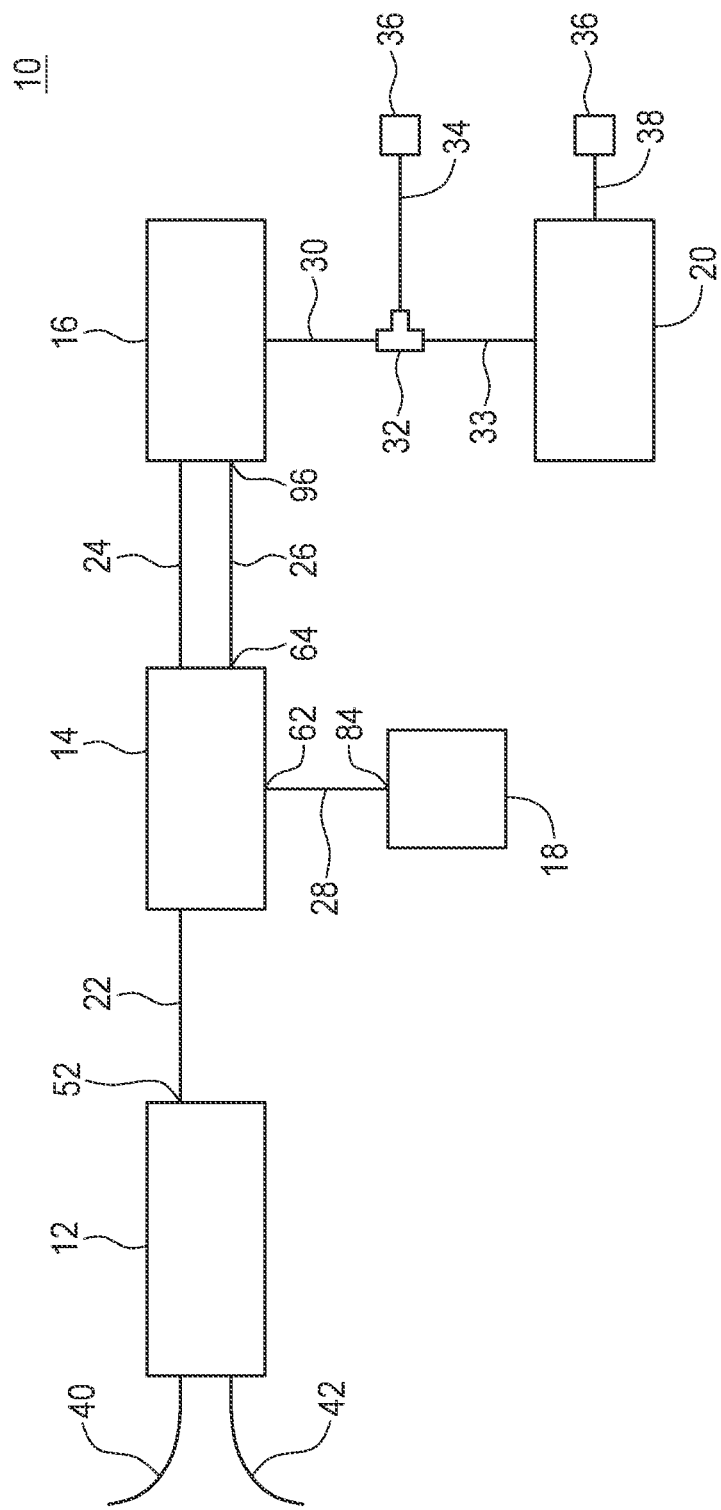
FIG. 1 is a block diagram depicting one embodiment of a DC-powered compressor system.

Referring to FIG. 1, one embodiment of DC-powered system 10 for controlling air compressor unit 16 is shown. In the illustrated embodiment, system 10 can comprise battery box 12, which can further comprise a plurality of DC batteries cells that can be charged by a battery charger disposed therein. In some embodiments, the battery charger can be powered by a supply of alternating current ("AC") power. The AC power can be supplied by a source of commercial AC power (not shown) via power line 40. The AC power can also be supplied by a source of AC power from an AC inverter (not shown) via power line 42. In either embodiment, the AC can be, nominally, 120 volts AC, 220 volts AC, 240 volts AC or any other standard voltage operating at 50 Hertz ("Hz") or 60 Hz, as well known to those skilled in the art. In some embodiments, battery box 12 can supply a source of DC power to control panel 14 via power line 22. In further embodiments, control panel 14 can be operatively connected to control box 18 via control cable 28. In some embodiments, control box 18 can be configured to operate control panel 14 to turn on or turn off a supply DC power to air compressor unit 16 via power cables 24. In further embodiments, control panel 14 can control the operation of air compressor unit 16 via control cable 26. When system 10 is operating, air compressor unit 16 can provide a supply of compressed air via air line 30, tee fitting 32 and air line 34 to air connector 36. In some embodiments, compressed air can be further supplied from tee fitting 32 to air tank 20 configured to hold compressed air. Air tank 20 can further a supply of compressed air to air connector 36 via air line 38.

Figure 2A:
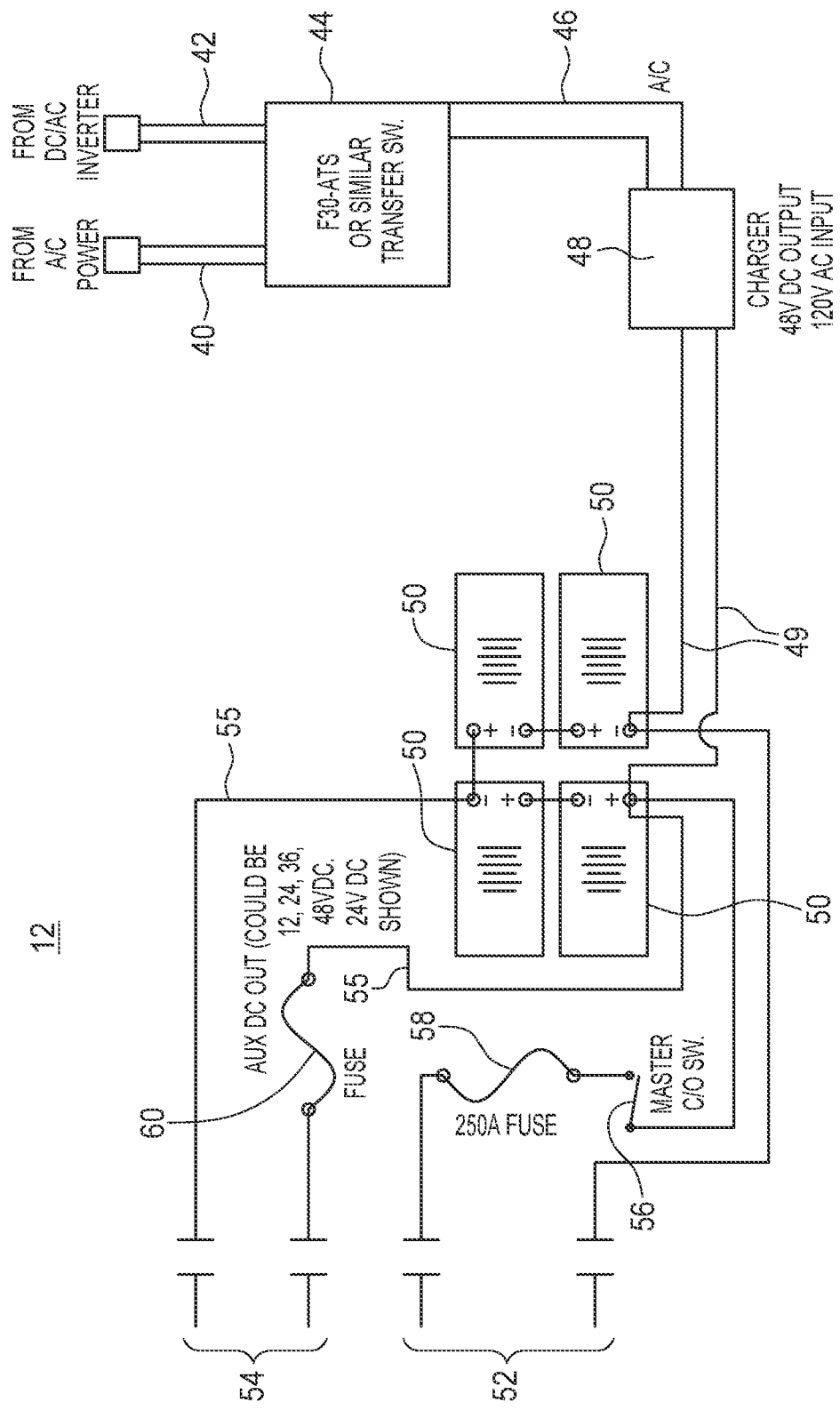
FIG. 2A is a block diagram depicting one embodiment of a battery box for use with the compressor system of FIG. 1.

Referring to FIG. 2A, one embodiment of battery box 12 is shown. Battery box 12 can comprise at least one DC battery 50 for supplying DC power, which can further comprise a lead-acid DC battery, a lithium ion DC battery or any other DC battery as well known to those skilled in the art. Each battery cell 50 can comprise a single DC battery cell or a plurality of DC battery cells to provide a desired output DC voltage. In some embodiments, each battery 50 can output 12 volts DC power and have a charge capacity of 360 ampere-hours, although any suitable battery of voltage and capacity can be selected by those skilled in the art as required to operate system 10. In the illustrated embodiment, four batteries 50 are wired in series to provide a nominal 48 volts DC output power. In some embodiments, the output voltage can be supplied to output terminals 52 via master cutoff switch 56 and output fuse 58, all connected in series. In some embodiments, battery box 12 can further comprise auxiliary power output 54, which can comprise power leads 55 connected to one or more of batteries 50, via fuse 60, to provide a supply of auxiliary DC power. In the illustrated embodiment, the auxiliary output voltage is supplied by two batteries 50 or 24 volts DC, nominally, although the auxiliary output voltage could be 12 volts DC, 36 volts DC or 48 volts DC, or any multiple of 12 volt batteries to provide up to 96 volts DC, depending on the number of batteries 50 power leads 55 are connected to.

In some embodiments, batteries 50 can be charged by battery charger 48 via power cables 49, which can provide a DC output power for charging batteries 50 while being supplied with a 120 volts AC power input via power cables 46. In the illustrated embodiment, battery charger 48 can provide a nominal 48 volts DC output power to charge batteries 50 as shown, although it is obvious to those skilled in the art that battery charger 48 can be configured to provide the necessary DC output voltage required to charge different series and/or parallel configurations using a multiple number of batteries 50. In a representative embodiment battery charger 48 can comprise a QuiQ™ 1 kW industrial battery charger as manufactured by Delta-Q Technologies of Burnaby, British Columbia, Canada although any other suitable battery charger as known by those skilled in the art can be used. In some embodiments, battery box 12 can select from different sources of AC input power. As illustrated in FIG. 2, commercial AC input power can be supplied over power cables 40 while AC input power from a DC-power to AC-power inverter can be supplied over power cables 42. Battery box 12 can further comprise transfer switch 44 to select one or the other of power cables 40 and 42 to select the source of the AC input power provided to battery charger 48. In a representative embodiment, transfer switch 44 can comprise a model F30-ATS as manufactured by Furrion Ltd. of Sheung Wan, Hong Kong although any other suitable transfer switch as known by those skilled in the art can be used.

Figure 2B:
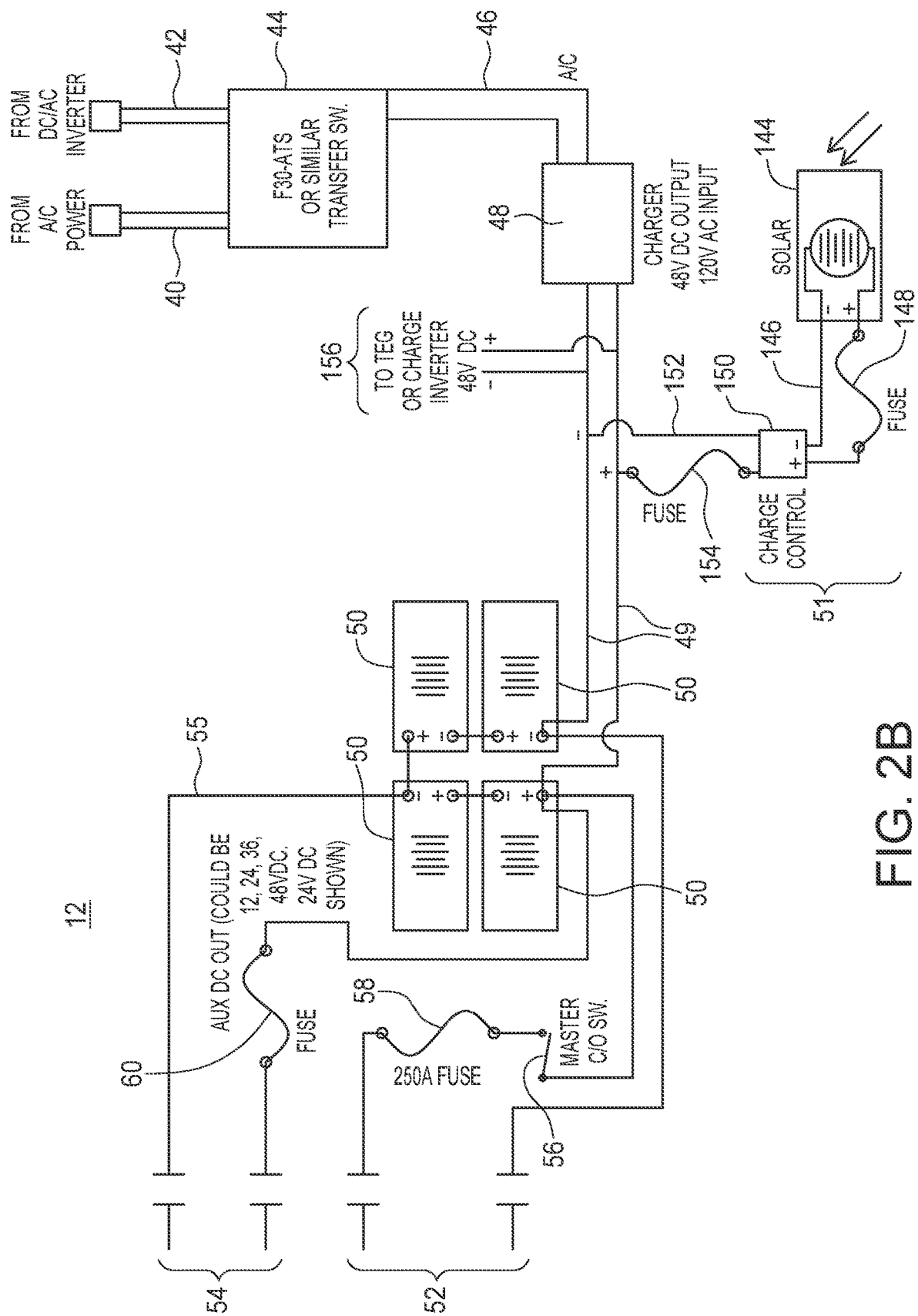
FIG. 2B is a block diagram depicting a second embodiment of the battery box of FIG. 2A.

In some embodiments, system 10 can further comprise solar panel charging system 51 configured for charging batteries 50, as shown in FIG. 2B. In these embodiments, solar panel charging system 51 can be used to charge batteries 50 when AC power is not available to power charger 48. In some embodiments, system 51 can comprise solar panel unit 144 connected to charge control unit 150 via power cables 146 and 148. Charge control unit 150 can control the flow of power from solar panel unit 144 to power cables 49 via power cables 152 and fuse 154. In further embodiments, power from power cables 49 can be fed or diverted to an inverter to supply AC power to AC-powered electrical or electronic equipment. An example of a suitable solar panel charging unit 144 is model no. CKPV5M60 solar panel charging unit as manufactured by Superb Solar Co., Ltd. Of Dongguan City, China, although any suitably equivalent solar panel charging unit as known to those skilled in the art can be used.

Figure 3A:
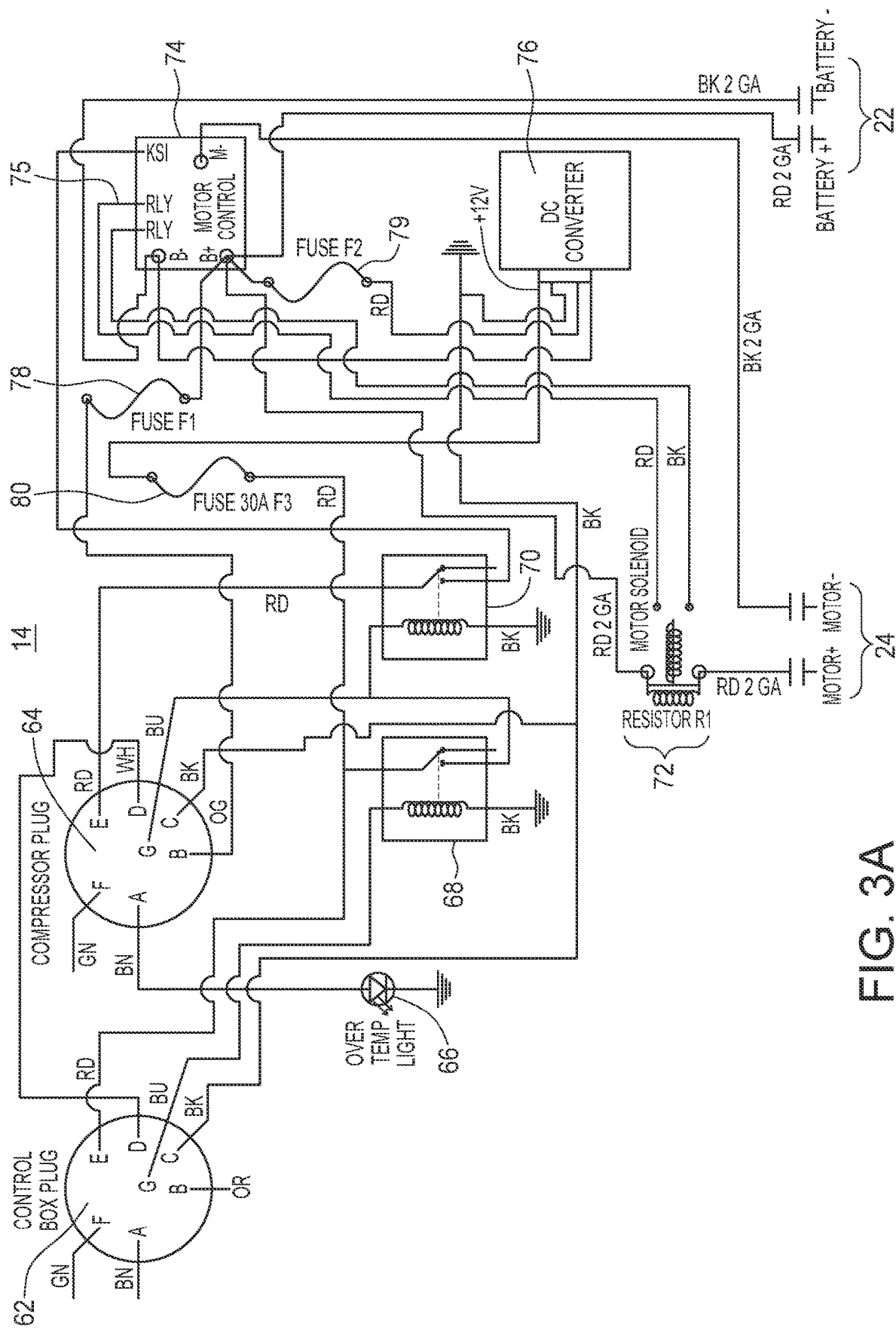
FIG. 3A is an electrical schematic depicting one embodiment of a control panel circuit for use with the compressor system of FIG. 1.
Figure 8:
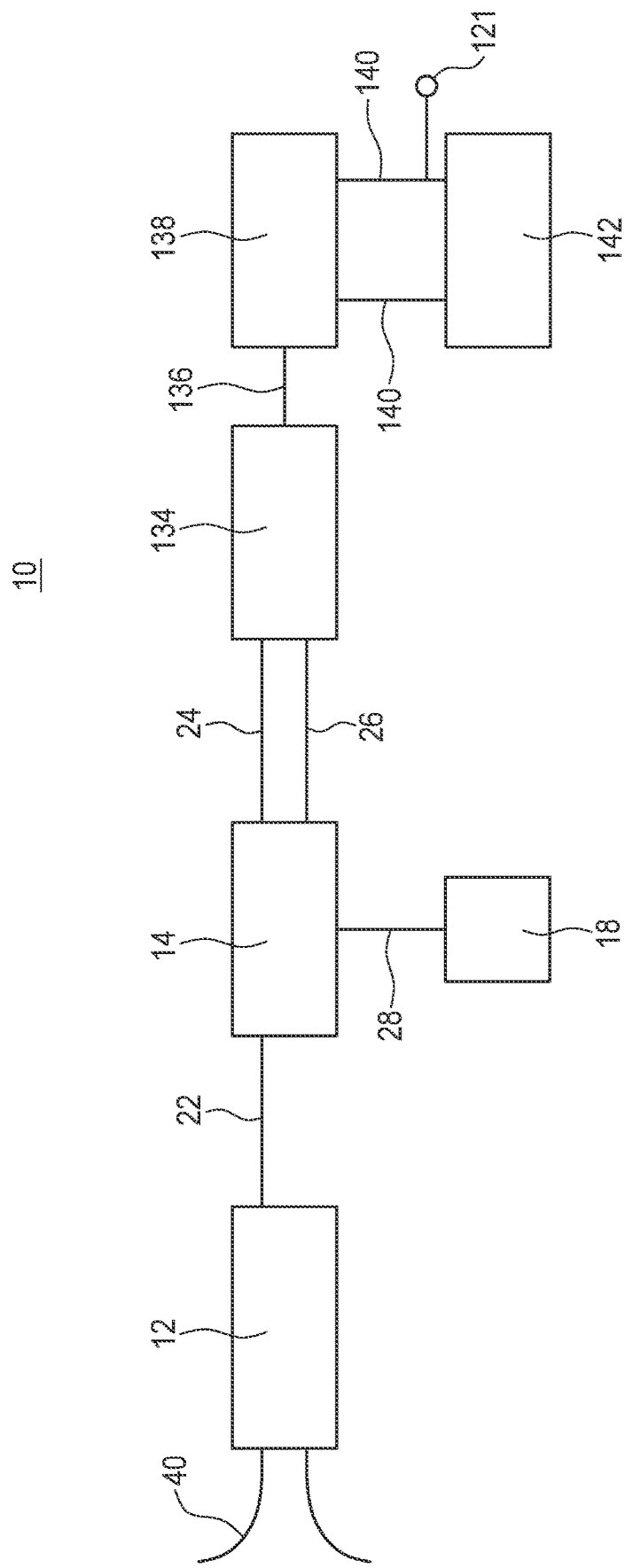
FIG. 8 is a block diagram depicting one embodiment of a DC-powered hydraulic fluid system.
Figure 9:
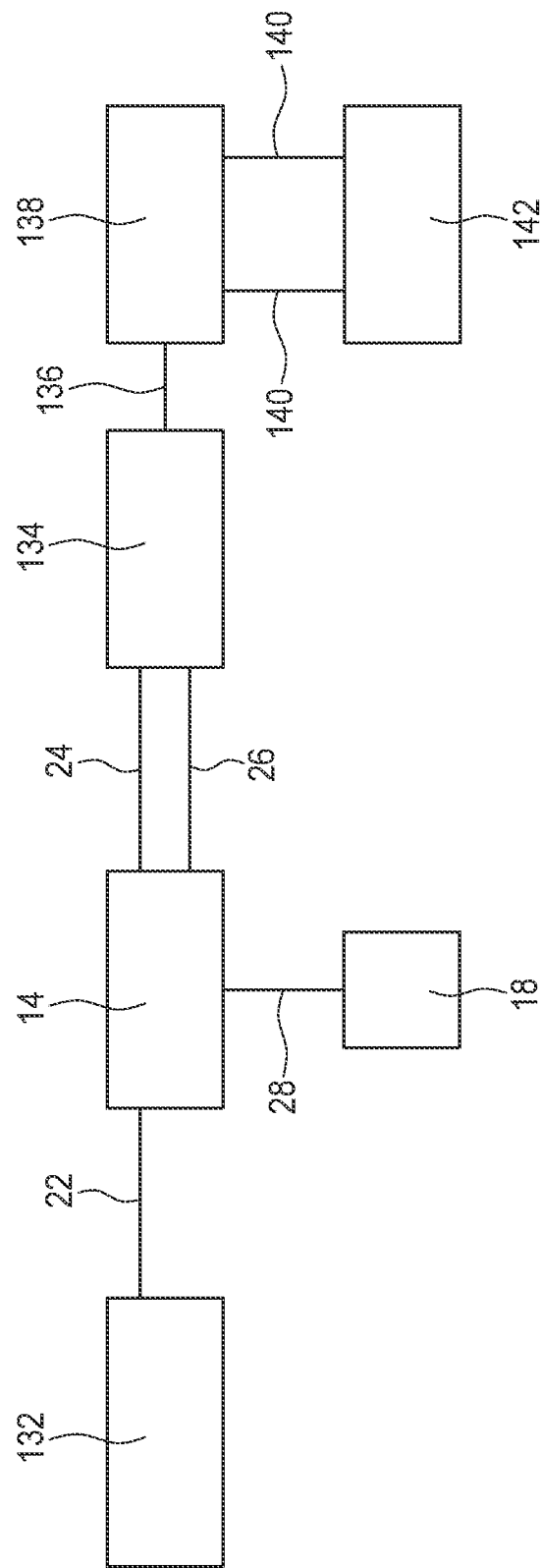
FIG. 9 is a block diagram depicting another embodiment of a DC-powered hydraulic fluid system.

Referring to FIG. 3A, an electric schematic of control panel 14 is shown. In embodiments, DC power supplied by battery box 12 can be supplied to motor controller 74 via power cables 22. In a representative embodiment, motor controller 74 can comprise a 48 volt SPM™ 400 amp electric motor controller as manufactured by Alltrax Inc. of Wilderville, Oreg., U.S.A. although any other suitable electric motor controller as known by those skilled in the art can be used. In some embodiments, a control signal from controller 74 over solenoid control wires 75 to motor solenoid 72 can control the flow of DC power to compressor unit 16 or hydraulic pump motor 134 (as shown in FIGS. 8 and 9) through motor solenoid 72 to power cables 24. In some embodiments, control panel 14 can comprise DC converter 76 for providing a supply of DC power for control circuitry in system 10. In a representative embodiment, DC converter 76 can convert 48 volts DC supplied from motor controller 74 via converter supply fuse 79 to 12 volts DC. Control panel 14 can comprise connector 62 for providing connection means for control signals between control panel 14 and control box 18. Control panel 14 can further comprise connector 64 for providing connection means for control signals between control panel 14 and compressor unit 16 or hydraulic pump motor 134 (as shown in FIGS. 8 and 9). In some embodiments, control panel 14 can comprise relays 66 and 68 for switching control signals required for the operation of system 10. While relays 66 and 68 can comprise electro-mechanical relays, any other suitable and functionally equivalent electrical or electronic device or means, whether analogue or digital or both, as well known to those skilled in the art can be used. Fuses 78 and 80 can be used to control the supply of DC power required for the circuitry used in the operation of system 10. Control panel 14 can further comprise alarm indicator 66, which can illuminate to provide a visual indicator when system 10 experiences an over temperature condition.

Figure 3B:
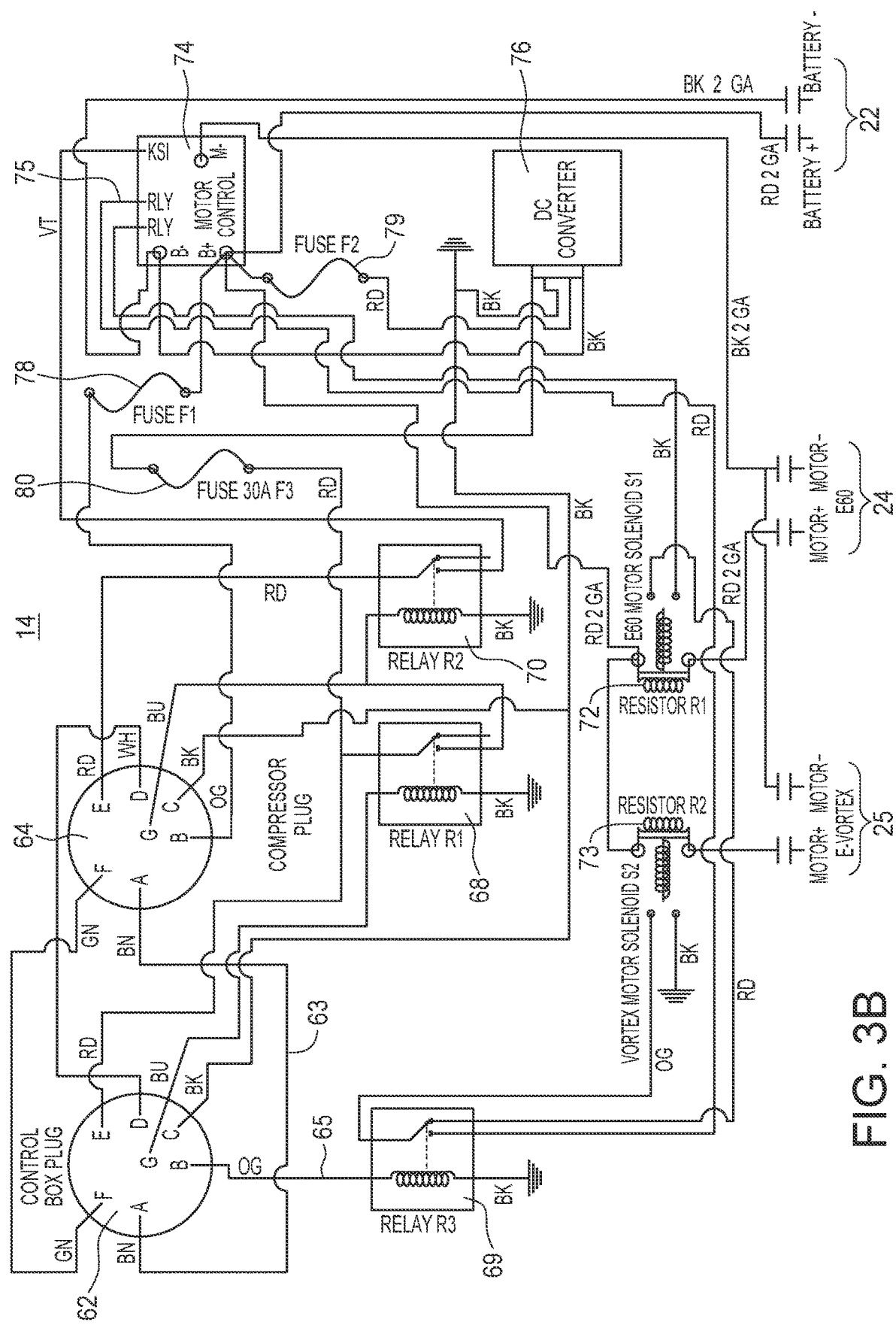
FIG. 3B is an electrical schematic depicting one embodiment of a control panel circuit for use with the compressor system of FIG. 1 and a hydraulic fluid pump system.

Referring to FIG. 3B, an alternate embodiment of control panel 14 is shown for use with a hydraulic fluid pump system. In this embodiment, control panel 14 can comprise hydraulic pump motor solenoid 73 connected to the B+ output of motor control module 74 to provide DC power to hydraulic pump motor 134 (as shown in FIGS. 6b, 8 and 9) via power cable 25. Solenoid 73 can be operated by a control signal provided over signal wire 65 connected from terminal B of control box connector 62 to relay 69 that can be used to select which of solenoids 72 and 72 are operated from solenoid control wires 75. To further enable the operation of hydraulic pump motor 134, terminal F of control box connector 62 can be connected to terminal F of compressor connector 64 via signal wire 63.

Figure 4:
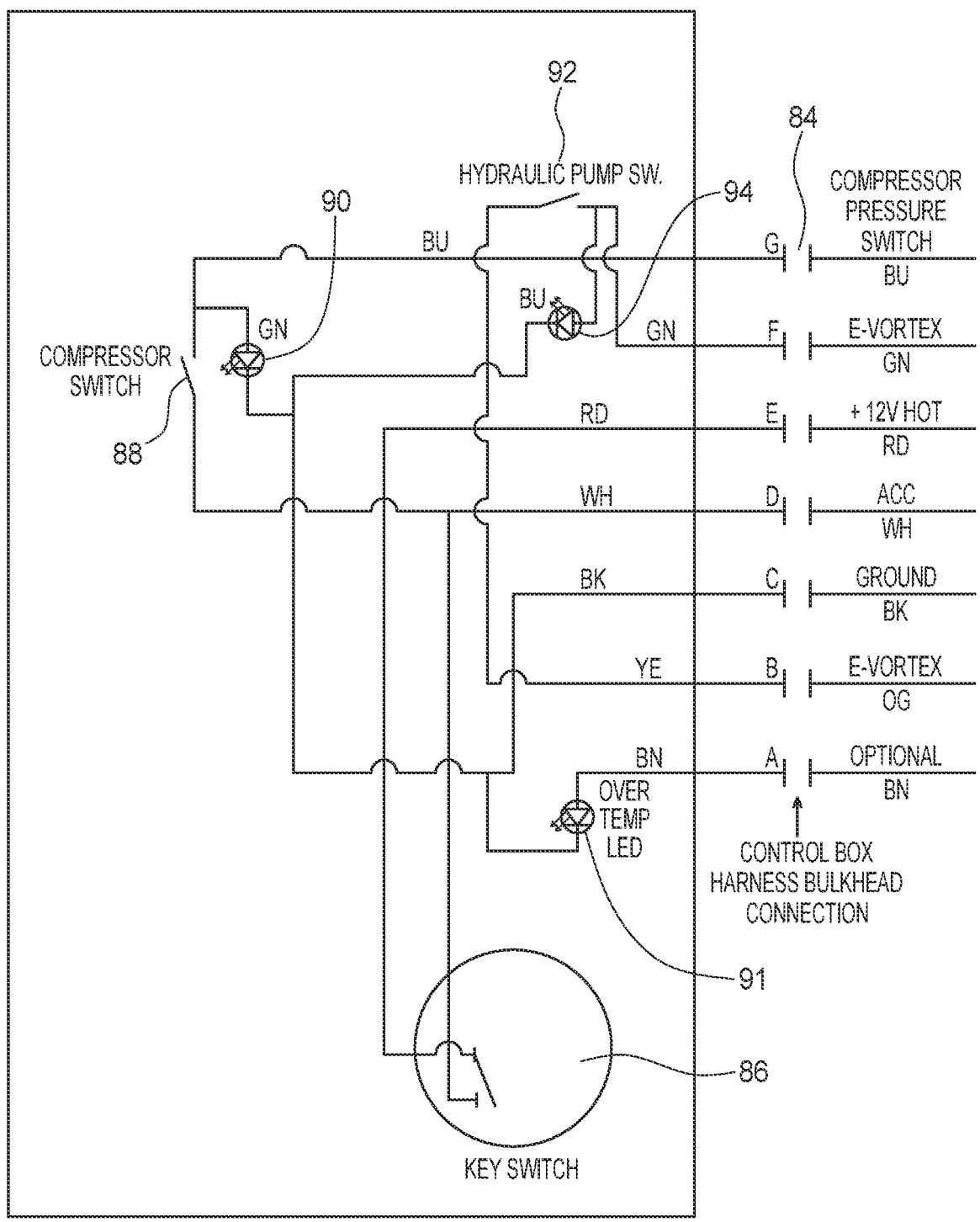
FIG. 4 is an electrical schematic depicting one embodiment of a control box circuit for use with the compressor system of FIG. 1.

Referring to FIG. 4, an embodiment of control box 18 is shown. In some embodiments, control box 18 can comprise housing 82 having bulkhead connector 84 for providing connection means for control signals between control panel 14 and control box 18. Control box 18 can comprise key switch 86 for providing a secure means for the activation and deactivation of system 10. When key switch 86 is turned "on", system 10 is activated, and compressor switch 88 can provide means for then turning on a supply of DC power to compressor unit 16 or hydraulic pump motor 134 (as shown in FIGS. 8 and 9). Visual indicator 90 can illuminate when switch 88 is closed to provide a visual indicator that DC power is being supplied to compressor unit 16 or hydraulic pump motor 134. In some embodiments, control box 18 can further comprise auxiliary switch 92, with a corresponding visual indicator 94, for controlling the operation of an optional or auxiliary control circuit as may be required in system 10. In some embodiments, switch 92 can be used to operate hydraulic pump motor 134, as shown in FIGS. 3B and 6B. In some embodiments, control box 18 can comprise over temperature LED 91 connected to terminal A of control box connector 84, which can illuminate where there is an over temperature condition.

Figure 5:
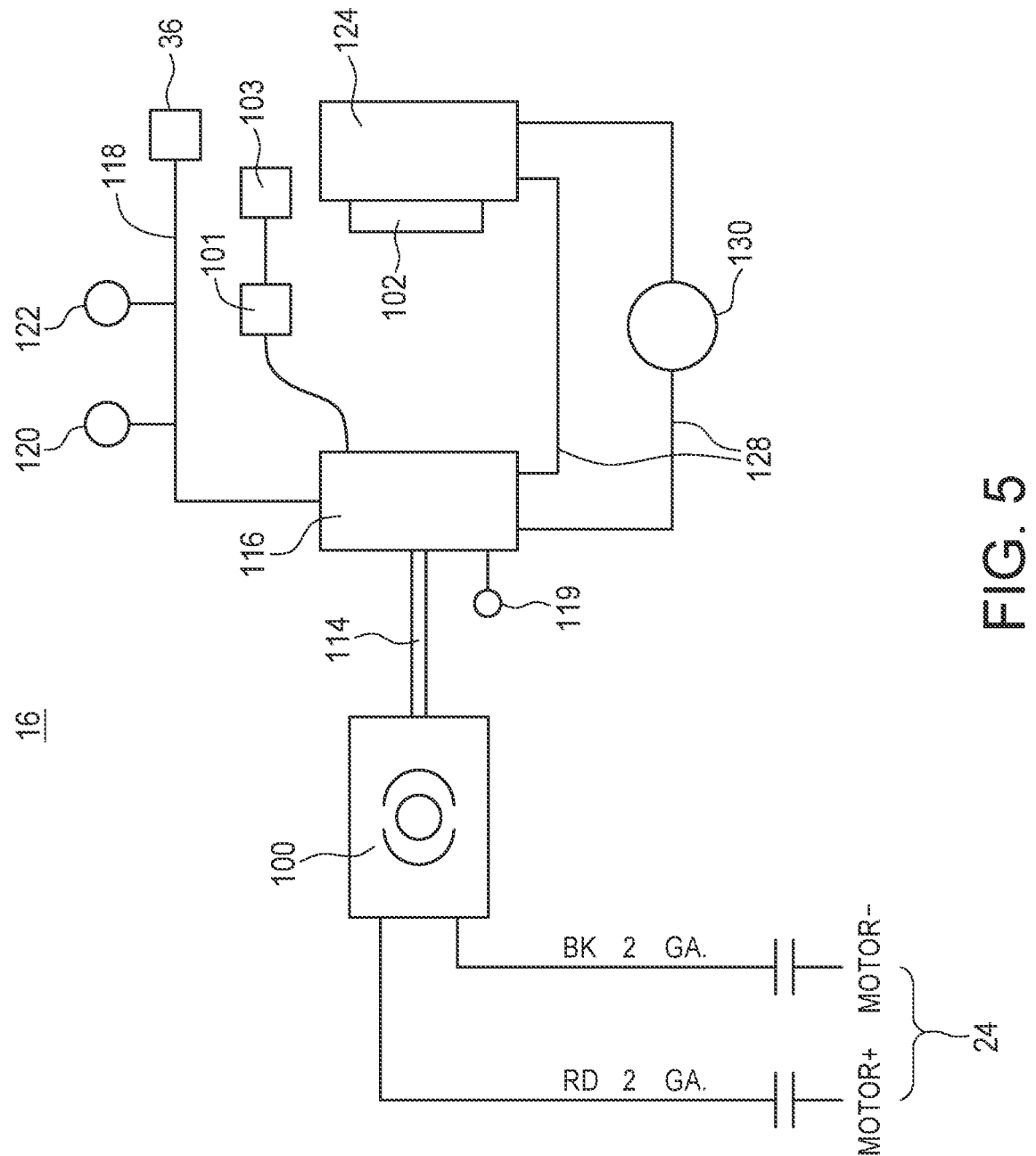
FIG. 5 is a block diagram depicting one embodiment of an air compressor unit for use with the compressor system of FIG. 1.

Referring to FIG. 5, a block diagram of one embodiment of compressor unit 16 is shown. In some embodiments, compressor unit 16 can comprise electric motor 100 coupled to air compressor 116 via coupling shaft 114. Power cables 24 can provide the means for the supply of DC power from control panel 14 to motor 100. In a representative embodiment, motor 100 can comprise a model LEM-200 axial gap permanent magnet electric motor as manufactured by Lynch Motor Company Ltd. of Dunkeswell, Honiton, Devon, England although any suitably equivalent DC electric motor as known by those skilled in the art can be used. In some embodiments, air compressor 116 can provide a supply of compressed air through air line 118 to air connector 36. In a representative embodiment, air compressor 116 can comprise a rotary screw-type air compressor that can supply compressed air at 100 pounds per square inch ("PSI") at a rate of up to 60 cubic feet per minute ("CFM"). An example of a suitable air compressor is model NK31 air compressor as manufactured by Rotorcomp Verdichter Gmbh of Germering, Germany although any suitably equivalent air compressor as known by those skilled in the art can be used. Over pressure switch 120 can be operatively coupled to air line 118 to monitor the air pressure within air line 118, and can be further configured to operate a shut-down condition of system 10 when the air pressure in air line 118 exceeds a predetermined threshold. Air gauge 122 can be operatively coupled to air line 118 for monitoring the air pressure in air line 118 when system 10 is in operation. In some embodiments, air compressor 116 can be oil-cooled with oil lines 128 circulating cooling oil between air compressor 116 and radiator 124 through oil filter 130. Cooling fan 102 can be attached to radiator 124 to cause air to flow through radiator 124 for cooling the cooling oil. Cooling fan 102 can further comprise an electric fan motor that is thermostatically controlled to turn on when the temperature of the cooling oil and/or radiator 124 exceeds a predetermined threshold.

Figure 6A:
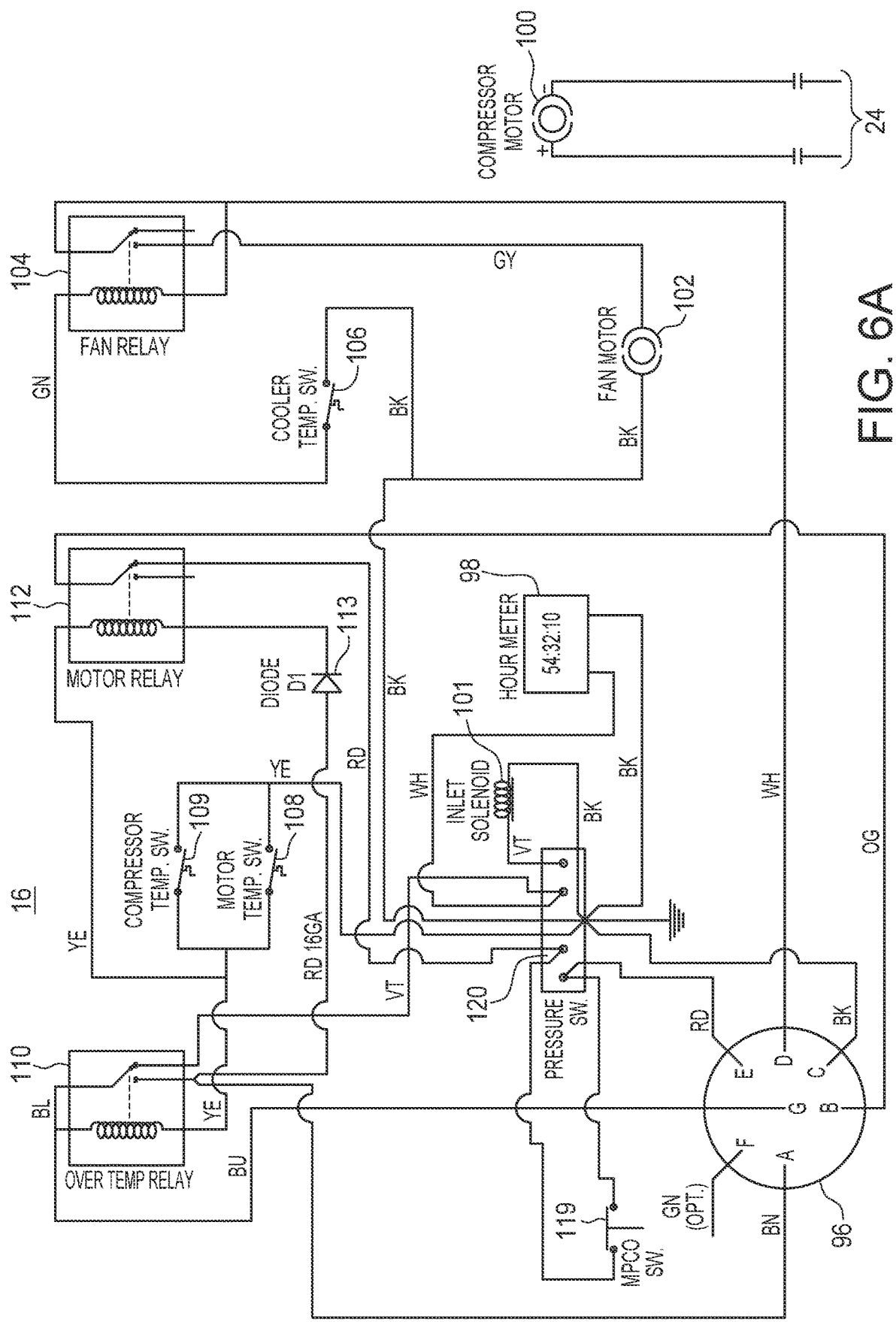
FIG. 6A is an electrical schematic depicting one embodiment of an electrical circuit for use in the air compressor unit of FIG. 5.

Referring to FIG. 6A, an electrical schematic of one embodiment of air compressor unit 16 is shown. In some embodiments, air compressor unit 16 can comprise connector 96 for providing connection means for control signals between control panel 14 and compressor unit 16. Air compressor unit 16 can comprise motor temperature switch 108, which can be either integral to motor 100 or disposed separately on motor 100, to disable motor 100 when the temperature therein exceeds a predetermined threshold. When switch 108 is activated due to an over temperature condition in motor 100, motor relay 112 can activate to disconnect the supply of DC power to motor 100 via the control signals between compressor unit 16 and control panel 14. In some embodiments, air compressor unit 16 can further comprise compressor over temperature switch 109, can be wired or connected in parallel with motor temperature switch 108. If air compressor 116 (as shown in FIG. 5) experiences an over temperature condition, switch 109 can activate motor relay 112 to disconnect the supply of DC power to motor 100, as described above. Diode 113 can discharge the energy in the coil of relay 112 when switch 108 or 109 operates. Air compressor unit 16 can further comprise over pressure switch 120 disposed in the same circuit as motor relay 112, and can be a normally-closed switch whereupon an over pressure condition occurring, switch 120 can open to disable the operation of motor 100, similar to when motor relay 112 is activated due to an over temperature conditions, as described above. Pressure switch 120 can also control the operation of inlet solenoid 101, which can control the flow of input air via air filter 103 from the atmosphere into compressor 116 (as shown in FIG. 5). When pressurized air is required, pressure switch 120 will close its contacts and operate inlet solenoid 101 to allow the inlet of air into compressor 116. When a desired air pressure level has been reached, pressure switch 120 will open and, thus, close inlet solenoid 101 to prevent the inlet of air into compressor 116.

In some embodiments, minimum pressure cut-off ("MPCO") switch 119 can be wired in parallel with the contacts on pressure switch 120 that control the operation of compressor motor 100. MPCO switch 119 can be disposed on the housing of compressor 116 to monitor the air pressure thereon. In operation, compressor 116 will operate intermittently to maintain a desired operating air pressure. During operation, the air pressure in the housing air compressor 116 will dissipate and lower when motor 100 is turned off. However, if the demand for compressed air requires the operation of compressor 116 to resume when the air pressure within its housing is greater than a predetermined level, 60 psi as an example, the amount of DC current required to operate compressor motor 100 and compressor 116 from a dead stop is greater than when the air pressure within the housing of compressor is less than this predetermined level. Therefore, MPCO switch 119 remains closed and keeps motor 100 and compressor 116 operating when the air pressure within compressor 116 is greater than the predetermined level, notwithstanding that inlet solenoid 101 is closed, so as to minimize the amount of DC power required to operate motor 100 when compressor 116 is required to supply compressed air. In other embodiments, a timer circuit or mechanism can be used to prevent the operation of motor 100 and compressor 116 until the air pressure within the housing of compressor 116 internally dissipates or lowers to below 60 psi, wherein motor 100 can be activated to operate compressor 116 again.

In some embodiments, air compressor unit 16 can comprise fan relay 104 that can be operatively connected to fan motor 102 and fan temperature switch 106. When the temperature in the cooling oil and/or radiator 124 exceeds a predetermined threshold, as described above, fan switch 106 can close thereby activating fan relay 104 to turn on fan motor 102 to provide a flow of air through radiator 124. In some embodiments, hour meter 98 can be turned on to log the duration of time that system 10 is operating when pressure switch 120 is closed.

Figure 10:
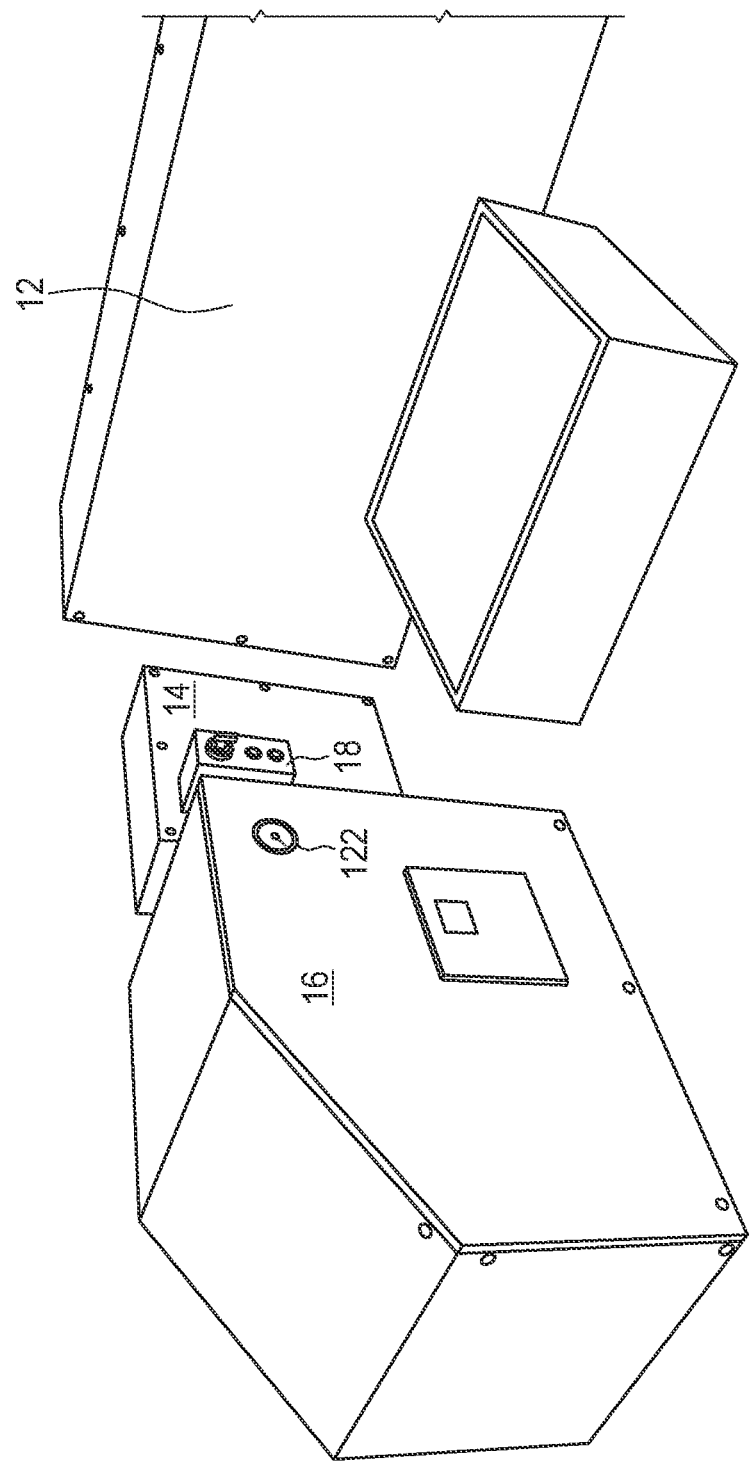
FIG. 10 is a perspective view depicting the installation of the compressor system of FIG. 1 in the cargo bed of a service truck.

In operation, system 10 can be mounted in a motor vehicle used by field service personnel to service heavy duty equipment, machinery and vehicles. Referring to FIG. 10, an example of how system 10 can be mounted in the cargo bed of a service truck. In this example, battery box 12 can be installed in the bed behind the cab of the truck, whereas control panel 14 and air compressor unit 16 can be installed along one side of the cargo bed. Control box 18 can be disposed on a side surface of control panel 14, as shown in FIG. 10. Air tank 20 (not shown) can be mounted underneath, on or in the cargo bed of the service truck, as well known to those skilled in the art.

Referring to FIG. 6B, an embodiment of compressor unit 16 is shown for use with a hydraulic fluid pump system. In this embodiment, pressure switch 120 is replaced with pressure switch 121 (as shown in FIG. 8), which can open and stop operation of pump motor 134 when the pressure of the hydraulic fluid reaches a predetermined pressure. In addition, motor temperature switch 108 is replaced with motor temperature switch 208, which can be disposed in pump motor 134. In some embodiments, air compressor unit 16 can comprise remote activation switch 97 for turning on system 10.

Figure 7:
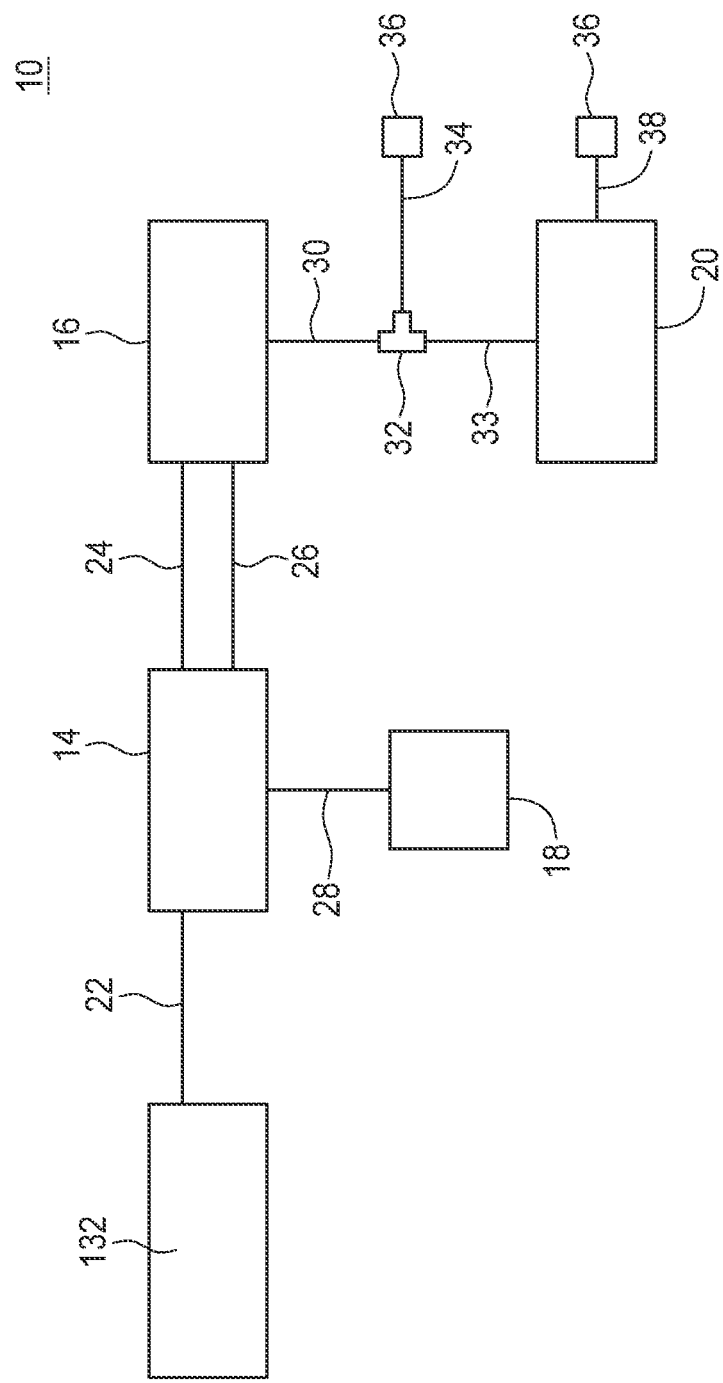
FIG. 7 is a block diagram depicting another embodiment of a DC-powered compressor system.

Referring to FIG. 7, another embodiment of system 10 is shown. In this embodiment, system 10 can comprise internal combustion engine-powered generator 132 that can be configured to provide a supply of DC power for operating air compressor unit 16. Examples of such generators include engine-driven electric welders as manufactured by Lincoln Electric of Cleveland, Ohio, U.S.A. although any other functionally equivalent electric-driven generators as known to those skilled in the art can be used. In this embodiment, generator 132 can replace battery box 12 to provide the supply of DC power for system 10. In practice, this embodiment of system 10 can be installed on a welding truck that already includes an engine-driven electric welder to provide the supply of DC power required to operate system 10.

Referring to FIG. 8, an embodiment of system 10 configured to operate hydraulic fluid pump motor 134 for use in operating a pressurized hydraulic fluid system. In this embodiment of system 10, air compressor unit 16 is replaced with electric hydraulic pump motor 134 operatively coupled to hydraulic fluid pump 138 via coupling shaft 136. An example of a suitable hydraulic fluid pump is model 11W28-7362 hydraulic pump as manufactured by Bosch Rexroth AG of Würzburg, Germany although any suitably equivalent hydraulic fluid pump as known by those skilled in the art can be used. DC power for operating pump motor 134 can be supplied by battery box 12, and controlled by control panel 14 and control box 18, and can function similarly in the embodiment of system 10 as shown in FIG. 1, and as described above. Hydraulic fluid pump 138 can be coupled to pressurized hydraulic fluid system 142 via hydraulic fluid lines 140. Hydraulic fluid system 142 can comprise one of more of various hydraulic fluid system components as well known to those skilled in the art, without limitation, hydraulic fluid tanks, hydraulic fluid accumulators, coolers and heat exchangers, hydraulic fluid filters and filtration components, hydraulic motors, control valves, swash plates, hydraulically-operated rams and cylinders, hydraulic fluid hoses, lines and fittings, hydraulic fluid manifolds, hydraulic fluid pressure gauges and transducers, hydraulic fluid pressure switches, and any other hydraulic fluid componentry that can be used in a hydraulic fluid system, as well known to those skilled in the art. In representative embodiments, system 10 can pump up to 12 gallons per minute ("GPM") of hydraulic at a pressure of up to 3000 ("PSI") using 48 volts DC, although higher pressure can be obtained if a higher operating voltage is used. In operation, this embodiment of system 10 can replace power take-off ("PTO") systems that can be installed on motor vehicles, and can provide the delivery of pressurized hydraulic fluid at pressures and volumes that exceed typical PTO systems.

Referring to FIG. 9, another embodiment of system 10 is shown for operating hydraulic fluid pump motor 134 used in operating a pressurized hydraulic fluid system. In this embodiment, system 10 can comprise internal combustion engine-powered generator 132, similar to the embodiment of system 10 as shown in FIG. 7, wherein generator 132 can be configured to provide a supply of DC power for operating pump motor 134.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. An apparatus for a service vehicle, the service vehicle comprising a service vehicle battery, the apparatus comprising:
   a direct current ("DC") powered system configured for controlling an air compressor, the system configured for installation on or in the service vehicle, the system further comprising:
   a) a system battery, wherein the system battery is externally charged and electrically isolated from the service vehicle battery, wherein the system battery is not operatively connected to the service vehicle battery, the system battery configured for supplying a direct current ("DC") power to power the air compressor to provide a compressed air;
   b) a control panel operatively connected to the system battery, the control panel configured to control a flow of the DC power supplied by the system battery;
   c) an electric motor operatively connected to the control panel, the electric motor configured to operate the air compressor upon the DC power being supplied to the electric motor by the control panel;
   d) a control box operatively connected to the control panel via a control cable, the control box configured for activating and deactivating the control panel, the control box disposed separately from the control panel; and
   e) a motor temperature switch configured to disconnect a supply of the DC power to the electric motor when the electric motor experiences an over temperature condition.

2. The apparatus as set forth in claim 1, wherein the system battery is disposed in a battery box configured to be positioned on a cargo bed of the service vehicle, the battery box further comprising a battery charger configured for charging the system battery, the battery box further configured for receiving a source of alternating current ("AC") power for powering the battery charger.

3. The apparatus as set forth in claim 2, wherein the battery box further comprises an AC power transfer switch for controlling the flow of the source of AC power to the battery charger.

4. The apparatus as set forth in claim 1, further comprising:
   a solar panel charging unit configured for charging the system battery.

5. The apparatus as set forth in claim 1, wherein the control panel further comprises a motor controller for controlling a flow of the DC power to the electric motor.

6. The apparatus as set forth in claim 1, wherein the air compressor further comprises a screw-type air compressor.

7. The apparatus as set forth in claim 1, further comprising an air tank operatively connected to the air compressor.

8. The apparatus as set forth in claim 1, further comprising the hydraulic fluid pump and a pressurized hydraulic fluid system operatively connected to the hydraulic fluid pump.

9. The apparatus as set forth in claim 8, wherein the hydraulic fluid system comprises a member of a group consisting of hydraulic fluid tanks, hydraulic fluid accumulators, coolers and heat exchangers, hydraulic fluid filters and filtration components, hydraulic motors, control valves, swash plates, hydraulically-operated rams and cylinders, hydraulic fluid hoses, lines and fittings, hydraulic fluid manifolds, hydraulic fluid pressure gauges and transducers, and hydraulic fluid pressure switches.

10. The apparatus as set forth in claim 1, wherein the system comprises the air compressor.

11. The apparatus as set forth in claim 1, wherein the system is further configured for controlling a hydraulic fluid pump, wherein the system battery is configured for supplying the DC power to power the hydraulic fluid pump to pump a hydraulic fluid, and wherein the electric motor is configured to operate the hydraulic fluid pump.

12. The apparatus as set forth in claim 8, wherein at least one of the control panel, the control box, the electric motor and either of the air compressor and the hydraulic fluid pump is configured to be disposed on a cargo bed of the service vehicle.

13. The apparatus as set forth in claim 1, wherein the system is configured to power the air compressor to provide the compressed air at a pressure of at least 100 pounds per square inch ("PSI") at least at a rate of 60 cubic feet per minute ("CFM").

14. The apparatus as set forth in claim 11, wherein the system is configured to power the hydraulic fluid pump to pump the hydraulic fluid at a pressure of at least 3000 pounds per square inch ("PSI") at a rate of 12 gallons per minute ("GPM").

15. The apparatus as set forth in claim 1, wherein the service vehicle lacks a power take-off ("PTO") system to operate the air compressor or the hydraulic fluid pump.

16. An improved service vehicle for servicing heavy duty equipment, machinery and vehicles, the improved service vehicle comprising a service vehicle battery, the improvement comprising:
   a direct current ("DC") powered system configured for controlling an air compressor or a hydraulic fluid pump, the system configured for installation on or in the service vehicle, the system further comprising:
   a) a system battery, wherein the system battery is externally charged and electrically isolated from the service vehicle battery, and wherein the system battery is not operatively connected to the service vehicle battery, the system battery configured for supplying a direct current ("DC") power to power the air compressor to provide a compressed air or to power the hydraulic fluid pump to pump a hydraulic fluid;
   b) a control panel operatively connected to the system battery, the control panel configured to control a flow of the DC power supplied by the system battery;
   c) an electric motor operatively connected to the control panel, the electric motor configured to operate the air compressor or the hydraulic fluid pump upon the DC power being supplied to the electric motor by the control panel;
   d) a control box operatively connected to the control panel via a control cable, the control box configured for activating and deactivating the control panel, the control box disposed separately from the control panel; and
   e) a motor temperature switch configured to disconnect a supply of the DC power to the electric motor when the electric motor experiences an over temperature condition.

17. The improved service vehicle as set forth in claim 16, wherein the system battery is disposed in a battery box configured to be positioned on a cargo bed of the service vehicle, the battery box further comprising a battery charger configured for charging the system battery, the battery box further configured for receiving a source of alternating current ("AC") power for powering the battery charger.

18. The improved service vehicle as set forth in claim 17, wherein the battery box further comprises an AC power transfer switch for controlling the flow of the source of AC power to the battery charger.

19. The improved service vehicle as set forth in claim 17, further comprising a solar panel charging unit configured for charging the battery.

20. The improved service vehicle as set forth in claim 16, wherein the control panel further comprises a motor controller for controlling a flow of the DC power to the electric motor.

21. The improved service vehicle as set forth in claim 16, wherein the system comprises the air compressor.

22. The improved service vehicle as set forth in claim 21, wherein the air compressor further comprises a screw-type air compressor.

23. The improved service vehicle as set forth in claim 21, wherein the system further comprises an air tank operatively connected to the air compressor.

24. The improved service vehicle as set forth in claim 16, wherein the system further comprises the hydraulic fluid pump.

25. The improved service vehicle as set forth in claim 24, further comprising a pressurized hydraulic fluid system operatively connected to the hydraulic fluid pump.

26. The improved service vehicle as set forth in claim 25, wherein the hydraulic fluid system comprises a member of a group consisting of hydraulic fluid tanks, hydraulic fluid accumulators, coolers and heat exchangers, hydraulic fluid filters and filtration components, hydraulic motors, control valves, swash plates, hydraulically-operated rams and cylinders, hydraulic fluid hoses, lines and fittings, hydraulic fluid manifolds, hydraulic fluid pressure gauges and transducers, and hydraulic fluid pressure switches.

27. The improved service vehicle as set forth in claim 16, wherein at least one of the control panel, the control box, the electric motor and either of the air compressor and the hydraulic fluid pump is configured to be disposed on a cargo bed of the service vehicle.

28. The improved service vehicle as set forth in claim 16, wherein the system is configured to power the air compressor to provide the compressed air at a pressure of at least 100 pounds per square inch ("PSI") at least at a rate of 60 cubic feet per minute ("CFM").

29. The improved service vehicle as set forth in claim 16, wherein the system is configured to power the hydraulic fluid pump to pump the hydraulic fluid at a pressure of at least 3000 pounds per square inch ("PSI") at a rate of 12 gallons per minute ("GPM").

30. The improved service vehicle as set forth in claim 16, wherein the service vehicle lacks a power take-off ("PTO") system to operate the air compressor or the hydraulic fluid pump.

31. A method for improving a service vehicle for servicing heavy duty equipment, machinery and vehicles, the service vehicle comprising a service vehicle battery, the method comprising:
  receiving a direct current ("DC") powered system configured for controlling an air compressor or a hydraulic fluid pump, the system further comprising:
    a) a system battery, wherein the system battery is externally charged and electrically isolated from the service vehicle battery, and wherein the system battery is not operatively connected to the service vehicle battery, the system battery configured for supplying a direct current ("DC") power to power the air compressor to provide a compressed air or to power the hydraulic fluid pump to pump a hydraulic fluid,
    b) a control panel operatively connected to the system battery, the control panel configured to control a flow of the DC power supplied by the system battery,
    c) an electric motor operatively connected to the control panel, the electric motor configured to operate the air compressor or the hydraulic fluid pump upon the DC power being supplied to the electric motor by the control panel, and
    d) a control box operatively connected to the control panel via a control cable, the control box configured for activating and deactivating the control panel, the control box disposed separately from the control panel, and
    e) a motor temperature switch configured to disconnect a supply of the DC power to the electric motor when the electric motor experiences an over temperature condition; and
  installing the system on or in the service vehicle.

32. The method as set forth in claim 31, further comprising installing the system battery in a battery box configured to be positioned on a cargo bed of the service vehicle, the battery box further comprising a battery charger configured for charging the system battery, the battery box further configured for receiving a source of alternating current ("AC") power for powering the battery charger.

33. The method as set forth in claim 32, further comprising controlling the flow of the source of AC power to the battery charger with an AC power transfer switch disposed in the battery box.

34. The method as set forth in claim 32, further comprising charging the system battery with a solar panel charging unit configured for charging the system battery.

35. The method as set forth in claim 31, further comprising controlling a flow of the DC power to the electric motor with a motor controller disposed in the control panel.

36. The method as set forth in claim 31, wherein the system further comprises the air compressor.

37. The method as set forth in claim 36, wherein the air compressor further comprises a screw-type air compressor.

38. The method as set forth in claim 36, wherein the system further comprises an air tank operatively connected to the air compressor.

39. The method as set forth in claim 31, wherein the system further comprises the hydraulic fluid pump.

40. The method as set forth in claim 39, wherein the system further comprises a pressurized hydraulic fluid system operatively connected to the hydraulic fluid pump.

41. The method as set forth in claim 40, wherein the hydraulic fluid system comprises a member of a group consisting of hydraulic fluid tanks, hydraulic fluid accumulators, coolers and heat exchangers, hydraulic fluid filters and filtration components, hydraulic motors, control valves, swash plates, hydraulically-operated rams and cylinders, hydraulic fluid hoses, lines and fittings, hydraulic fluid manifolds, hydraulic fluid pressure gauges and transducers, and hydraulic fluid pressure switches.

42. The method as set forth in claim 31, further comprising disconnecting a supply of the DC power to the electric motor when the electric motor experiences an over temperature condition with a motor temperature switch.

43. The method as set forth in claim 31, further comprising disposing at least one of the control panel, the control box, the electric motor and either of the air compressor and the hydraulic fluid pump on a cargo bed of the service vehicle.

44. The method as set forth in claim 31, wherein the system is configured to power the air compressor to provide the compressed air at a pressure of at least 100 pounds per square inch ("PSI") at least at a rate of 60 cubic feet per minute ("CFM").

45. The method as set forth in claim 31, wherein the system is configured to power the hydraulic fluid pump to pump the hydraulic fluid at a pressure of at least 3000 pounds per square inch ("PSI") at a rate of 12 gallons per minute ("GPM").

46. The method as set forth in claim 31, wherein the service vehicle lacks a power take-off ("PTO") system to operate the air compressor or the hydraulic fluid pump.

* * * * *